United States Patent [19]

Bebris et al.

[11] 3,869,409

[45] Mar. 4, 1975

[54] PROCESS FOR PREPARING A WIDE-PORE ADSORBENT FOR USE IN CHROMATOGRAPHY

[76] Inventors: Natalya Karlovna Bebris, ulitsa 26 Bakinshikh komissarov, 4, korp. 4, kv. 52; Andrei Vladimirovich Kiselev, Leningradskoe shosse, 120, korp. 3, kv. 4; Jury Stepanovich Nikitin, Leninskie Gory, MGU, Zona M, kv. 160, all of, Moscow; Yakov Ivanovich Yashin, propsekt Tsiolkovskogo, 50, kv. 143, Dzerzhinsk Gorkovskoi Oblasti, all of U.S.S.R.

[22] Filed: June 8, 1972

[21] Appl. No.: 260,734

[52] U.S. Cl................ 252/446, 252/451, 423/335, 423/338, 210/31 C
[51] Int. Cl........................ B01j 11/06, B01j 11/36
[58] Field of Search ........... 252/451, 446, 452, 428; 423/331, 332, 333, 334, 335, 338, 339; 210/31 C

[56] References Cited
UNITED STATES PATENTS

| | | | |
|---|---|---|---|
| 1,917,689 | 7/1933 | Baum | 252/446 X |
| 2,280,649 | 4/1942 | Kanhofer | 252/451 |
| 2,532,497 | 12/1950 | Hoekstra | 252/451 X |
| 2,866,760 | 12/1958 | Haessler et al. | 252/446 X |
| 3,511,775 | 5/1970 | Collins | 210/31 C |
| 3,677,938 | 7/1972 | Le Page et al. | 210/31 C |
| 3,714,035 | 1/1973 | Jones | 210/31 C |

*Primary Examiner*—C. Dees

[57] ABSTRACT

A process for preparing a wide-pore adsorbent for chromatography comprising preparing a suspension of a fine disperse non-porous silica having a specific surface area S of from 30 to 380 $m^2/g$. while modifying the silica surface. At this stage of the suspension preparation water is employed as a dispersion medium, while as a modifying component use is made of an alkali, a salt of an alkali or alkali-earth metal, or carbon black, or an organic solvent is employed as a liquid dispersion medium, while as a modifying component use is made of polyphenyldisiloxane or a polycondensation product of phenolphthalein and phthalic acid. Said suspension is subjected to drying at a temperature of from 15 to 200°C. The resulting silica xerogel is ground. The process according to the present invention makes it possbile to vary, within broad limits; adsorptive and chromatographic properties of the adsorbent being produced and to regulate, over a wide range, its selectivity. This, in turn, enables the use of the adsorbent for seperating mixtures of organic compounds of different classes.

9 Claims, 3 Drawing Figures

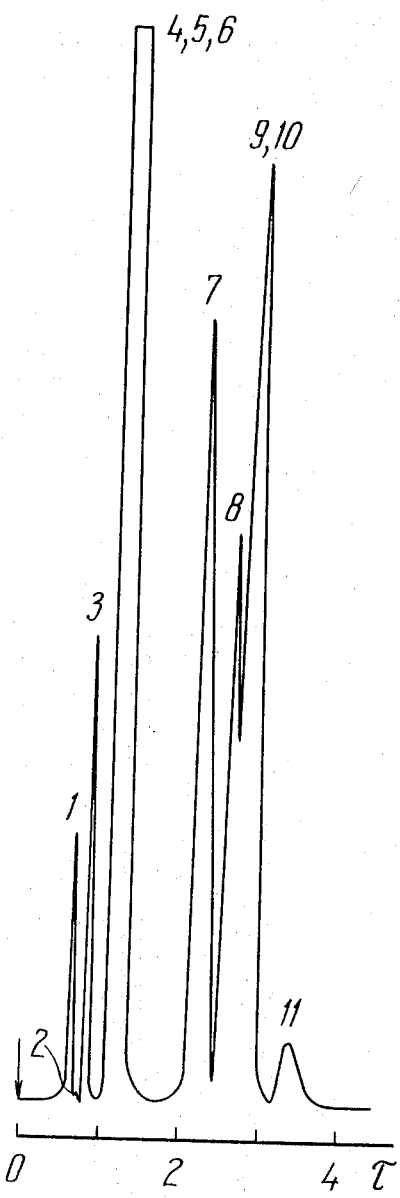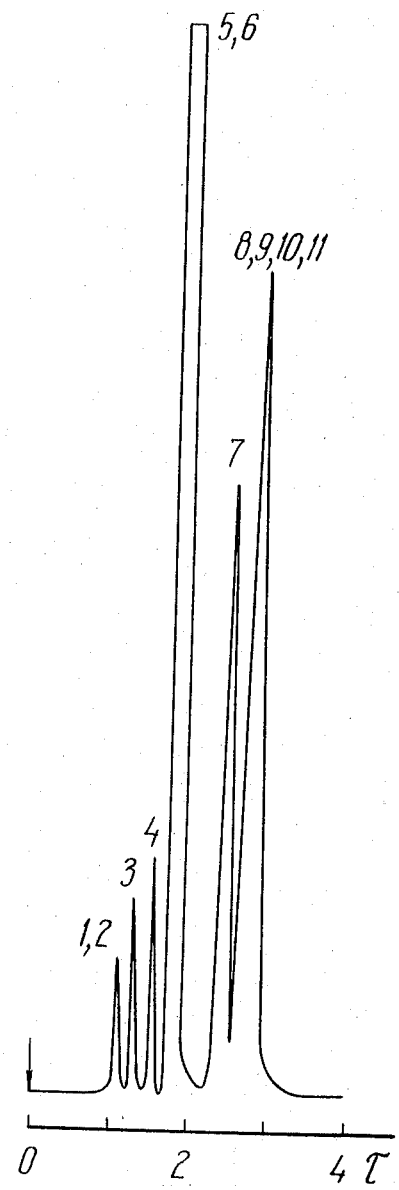
FIG. 1
FIG. 2

PROCESS FOR PREPARING A WIDE-PORE ADSORBENT FOR USE IN CHROMATOGRAPHY

The present invention relates to processes for the production of a wide-pore adsorbent adapted for use in chromatography from a finely dispersed non-porous silica having a specific surface area(S) of 30 to 380 m$^2$/g. Such an adsorbent is useful as an active packing in chromatographic columns in gas and liquid chromatography for the separation of low-, moderate-, and high-boiling substances, as well as a support of stationary phases in gas and liquid chromatography, and as a macromolecular sieve in gel-permeation chromatography.

Known in the art is a process for the production of a wide-pore adsorbent for chromatography from a finely dispersed non-porous silica (cf. N. K. Bebris et al. "Kolloidnyj zhournal," 29, No. 3, 326, 1967; N. K. Bebris et al. "Neftechimia" journal, 8, No. 3, 481, 1968; N. K. Bebris et al. "Neftechimia" journal, 10, No. 5, 726, 1970). According to this process an aqueous suspension of a finely dispersed non-porous silica having a specific surface area S of 170 or 280 m$^2$/g. is prepared, after which it is subjected to gelatinization at a temperature of 15° to 25°C, followed by drying at a temperature of 100° to 150°C. The resulting silica xerogel is calcined at a temperature of 750 to 950°C in the atmosphere of water vapour or at a temperature of 750° to 1,000°C in the air, after which it is ground and screened into fractions. The adsorbent produced by the process thus described has a specific surface area of 44 to 250 m$^2$/g. at an average pore diameter of 700 to 240A.

Said prior art process for the production of an adsorbent has the significant disadvantage residing in the impossibility of changing, within wide limits, the chemical nature of said adsorbent surface. Different calcination conditions employed in this known process can change only the concentration of hydroxyl groups on the silica surface which is insufficient for meaningful regulation of selective properties of an adsorbent within a wide range.

It is an object of the present invention to provide a process for preparing an adsorbent for chromatography from a finely dispersed non-porous silica which makes it possible to change, within wide limits, the adsorptive and chromatographic properties of the resulting adsorbent and regulate, over a broad range, its selectivity.

This and other objects of the present invention have been accomplished by preparing a suspension of a finely dispersed non-porous silica having a specific surface area(S) of 30 to 380 m$^2$/g. According to one embodiment of the invention, the silica surface is modified during preparation of the silica suspension in a liquid dispersion medium of water, while an alkali, alkali or alkali-earth metal salt or carbon black is used as a modifying component. In another embodiment of the invention, an organic solvent can be used as a liquid dispersion medium, while as a modifying component polyphenyldisiloxane or a polycondensation product of phenolphthalein and phthalic acid can be employed. The alkali-, or alkaline or alkali-earth metal salt content in the resulting suspension is 1 to 40 percent, carbon black content is 1 to 60 percent, and polymer content is 2 to 10 percent, based on the silica weight. Thereafter, the suspension is subjected to drying at a temperature of from 15 to 200°C. During this drying step the suspension is first converted into a non-flowing gel state and then into a solid state, the xerogel. The resulting silica xerogel is then ground.

It is advisable, for the purpose of reducing a specific surface area and stabilizing adsorption properties of an adsorbent, to calcinate it, prior to grinding of the xerogel, in the air or in an inert gas atmosphere at a temperature of 250° to 900°C.

The adsorbent produced by the process according to the present invention has a specific surface area of 4 to 180 m$^2$/g and a pore diameter of 280 to 12,200A.

The process of the present invention enables the production of an adsorbent of varied surface activity and of different selectivity, thereby enlarging the range of adsorbents available for chromatography.

Introducing modifying components in the stage of the suspension preparation ensures a high uniformity of distribution of said components both on the surface and within the adsorbent. Such uniformity cannot be obtained if these modifying components are introduced into an already formed structure of an adsorbent produced by the known process.

In addition to changing the chemical nature of an adsorbent's surface, modifying components in some cases exert an influence on the geometric structure of said adsorbent. Thus, an adsorbent produced from silica suspensions in aqueous alkali solutions possesses a considerably smaller specific surface area than an adsorbent produced by the known process.

An adsorbent produced from a finely dispersed non-porous silica having its surface modified by means of any of the above-quoted modifying components possesses adsorption properties varying within a wide range. This makes it possible to employ the adsorbent for the separation of mixtures of organic compounds pertaining to different classes. For instance, in modifying a silica surface with caustic potash the resulting adsorbent shows a high selectivity in respect of aliphatic unsaturated hydrocarbons and aromatic hydrocarbons in a mixture thereof with aliphatic saturated hydrocarbons. This adsorbent may be also used for separating divinyl from butylene isomers (said compounds cannot be separated on a non-modified adsorbent).

The use of carbon black as a modifying component makes it possible to produce an adsorbent which facilitates the separation of certain aliphatic saturated hydrocarbons and aromatic hydrocarbons which are impossible to separate on an adsorbent produced from a finely dispersed non-porous silica by the known process.

For further details of the invention, reference will be made to the accompanying drawings, wherein:

FIG. 1 is a chromatogram of a mixture of ethane, ethylene, propane, propylene, isobutane, n-butane, alpha-butylene, transbutylene, isobutylene, cis-butylene, and divinyl on an adsorbent produced by the process of the present invention, using caustic potash in the amount of 10% by weight of the silica as a modifying component;

FIG. 2 is a chromatogram of a mixture of the same hydrocarbons on an adsorbent produced by the known process without modifying the silica surface;

Figure 3:
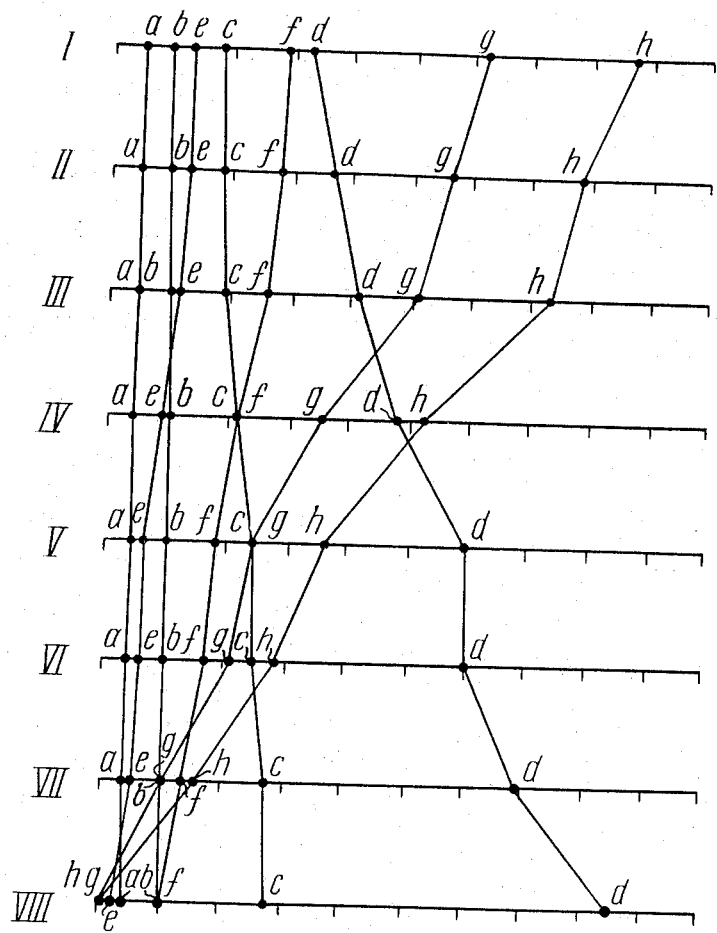

FIG. 3 shows scales with plotted thereon values of relative (in respect of n-heptane) retention volumes ($\alpha$) of n-hexane, n-heptane, n-octane, n-nonane, benzene, toluene, diethyl ether, and acetone on adsorbents produced by the process of the present invention using acetylene black as a modifying component taken in amounts of 1; 5; 10; 20; 27, and 42 percent based on the silica weight; and on an adsorbent produced by the known process, as well as on an adsorbent from acetylene black.

The preparation of a wide-pore adsorbent for chromatography from a finely dispersed non-porous silica is effected in accordance with any of the procedures described hereinbelow.

In the case where silica surface is modified using an alkali or salts of alkali- or alkaline earth metals, it is advisable to prepare an absorbent in the following manner: 1 part by weight of a finely dispersed non-porous silica, such as aerosil or white black, is mixed untill the formation of a homogeneous suspension with 1.6 to 8.3 parts by weight of water containing 0.02 to 0.4 part by weight of an alkali such as caustic potash, caustic soda, ammonium hydroxide, or a salt of an alkali or alkali-earth metal such as lithium chloride, potassium chloride, barium formate, or magnesium acetate. The suspension is subjected to drying at a temperature of from 15 to 200°C until the formation of a silica xerogel. The resulting xerogel is ground and screened into fractions. As has been indicated hereinabove, to decrease an adsorbent specific surface area and stabilize its adsorption properties, it is advisable to calcinate the xerogel, prior to grinding, in the air or in an inert gas atmosphere at a temperature of from 250° to 900°C.

In the case where the silica surface is modified using carbon black, an adsorbent should be prepared in the following manner: 1 part by weight of a finely dispersed non-porous silica is thoroughly mixed with 0.01–0.6 part by weight of carbon black such as acetylene black or graphitized channel black, after which they are mixed with 1.6 to 8.3 parts by weight of water until the formation of a uniform suspension. Said suspension is subjected to drying at a temperature of from 15° to 200°C until the formation of a silica xerogel. The resulting xerogel is ground and screened into fractions. In order to reduce a specific surface area of the adsorbent and stabilize its adsorption properties, the silica xerogel may be calcined, prior to grinding, in an inert gas atmosphere, such as nitrogen or helium, at a temperature of 900°C.

In the case where the silica surface is modified with a polymer, the adsorbent should be prepared in the following manner: 1 part by weight of a finely dispersed silica is mixed until the formation of a uniform suspension with 1.6 to 8.3 parts by weight of an organic solvent, such as benzene, dioxane, etc. containing 0.02 to 0.1 part by weight of a heat-resistant polymer, viz. polyphenyldisiloxane or a polycondensation product of phenolphthalein and phthalic acid. The resulting suspension is subjected to drying at a temperature of from 15° to 200°C. The silica xerogel thus obtained is ground and screened into fractions. Prior to grinding, the xerogel, for the above-mentioned purposes, may be calcined in the air or in the atmosphere of an inert gas such as nitrogen or helium at a temperature of from 250° to 300°C.

In all the above-described procedures of adsorbent preparation it is possible to employ different sequences of mixing of the components in the stage of the suspension preparation. Thus, when using water as a liquid dispersion medium, an aqueous suspension of a finely dispersed non-porous silica may be first prepared, followed by introducing a modifying component such as alkali, a salt of an alkali- or alkaline-earth metal or carbon black into the suspension. Or, when using an organic solvent as a liquid dispersion medium, a suspension of a finely dispersed non-porous silica in an organic solvent may be first prepared, followed by the introduction of a modifying component, viz. a polymer, into the suspension.

To enable a better understanding of the present invention the following examples, illustrating the preparation of a wide-pore adsorbent for chromatography from a finely dispersed non-porous silica, are given hereinbelow.

EXAMPLE 1

50 g of a finely dispersed non-porous silica having a specific surface area of 170 m$^2$/g. are mixed with 180 g. of an aqueous solution containing 5 g. of caustic potash. The resulting silica suspension is dried in the air at a temperature of 150°C, followed by calcination in air at a temperature of 650°C for a period of 6 hours. The calcined xerogel is ground and screened to separate the fraction having a particle size of 0.25 to 0.5 mm. The resulting adsorbent (Sample 1) has the following structural characteristics: specific surface area $S=16.5$ m$^2$/g.; pore volume $V=0.37$ cm$^3$/g.; average pore diameter $d=900$A.

Chromatographic properties of the adsorbent thus obtained are substantially different from those of the adsorbent prepared from the same finely dispersed silica by the known process.

This difference may be seen from FIG. 1 and 2 showing chromatograms of a mixture of hydrocarbon gases: ethane 1, ethylene 2, propane 3, propylene 4, isobutane 5, n-butane 6, alpha-butylene 7, trans-butylene 8, isobutylene 9, cis-butylene 10, and divinyl 11. The chromatogram of FIG. 1 is obtained on the adsorbent prepared as in Example 1 at a temperature of 60°C, while that of FIG. 2 is obtained on the adsorbent produced by the known process at the same temperature. Along the $\tau$ axis (FIGS. 1 and 2) time is plotted in minutes. As is seen from the chromatogram shown in FIG. 1, divinyl (II) separates rather well from butylenes (8, 9 and 10). The separation of these butylenes from divinyl cannot be obtained on the adsorbent prepared by the known process (as is supported by the chromatogram of FIG. 2).

Chromatographic properties of an adsorbent may be evaluated by the $\alpha$ factor which is a ratio of corrected retention volumes of two substances ($\alpha=v_g'/v_g''$) characterizing the selectivity of a stationary phase or adsorbent (cf. H. M. McNair, E. J. Bonelli, Basic Gas Chromatography, Oakland, Calif., 1967). The $\alpha$ value, unlike retention volumes $v_g$, is much less dependent on the temperature of a chromatographic experiment.

Values of relative (in respect of n-butane) retention volumes ($\alpha$) of unsaturated hydrocarbons, viz. divinyl and butylenes, as determined at the temperature of 60°C, are given in the following Table 1.

Table 1

| Adsorbent | Relative retention volumes ($\alpha$) of the hydrocarbons with respect to n-butane | | | |
|---|---|---|---|---|
| | n-butane | $\alpha$-butylene | trans-butylene | divinyl |
| Sample 1 prepared as in Example 1 | 1 | 2.5 | 2.6 | 4.4 |
| Sample prepared by the known process | 1 | 1.9 | 2.2 | 2.1 |

It is seen from Table 1, that the adsorbent prepared in accordance with the procedure disclosed in Example 1 has a stronger retention of the butylenes and divinyl than the adsorbent prepared from the finely dispersed silica of the known process.

EXAMPLE 2

Samples 2-5 of the adsorbent are prepared using an alkali such as KOH, NaOH, NH$_4$OH etc., as a surface-modifying agent for a finely dispersed non-porous silica. Said samples are prepared in accordance with the following procedure: 50 g. of a finely dispersed silica having a specific surface area of 130 or 170 m$^2$/g. are mixed with 180 g. of an aqueous solution of one of the above-mentioned modifying components. The resulting suspension is subjected to drying until the formation of a silica xerogel. The xerogel thus obtained is calcined and then ground to separate the 0.25-0.5 mm. fraction. In the preparation of Sample 3 the xerogel calcination is not performed.

The conditions of preparations and structural characteristics of adsorbent Samples 2-5 modified with an alkali are given in the following Table II.

Table II

| Adsorbent Sample No. | Specific surface area of non-porous silica, m$^2$/g. | Alkali content in the suspension, % by weight of silica | Drying temperature of the suspension, °C | Calcination temperature of the suspension, °C | Structural characteristics of the adsorbent Samples | | |
|---|---|---|---|---|---|---|---|
| | | | | | S, m$^2$/g | V, cm$^3$/g | d, Å |
| 2 | 130 | 1% KOH | 20 | 900 | 36 | 0.94 | 1040 |
| 3 | 170 | 10% KOH | 140 | — | 48 | 0.54 | 450 |
| 4 | 170 | 10% NH$_4$OH | 100 | 250 | 110 | 1.0 | 360 |
| 5 | 170 | 7% NaOH | 20 | 250 | 22 | — | — |
| Prepared by the known process | 170 | — | 140 | — | 170 | 1.32 | 300 |

It may be seen from Table II, that using alkalis as modifying agents for the synthesis of an adsorbent from a finely dispersed non-porous silica enables the regulation, within a broad range, of the adsorbent pore structure by decreasing the specific surface area S and increasing the average pore diameter $d$ as compared to the adsorbent Sample produced by the known process.

Data illustrating the chromatographic properties of the adsorbent Samples are given hereinbelow in the Summary Table.

EXAMPLE 3

Samples 6 to 11 of the adsorbent are prepared from a finely dispersed non-porous silica using the following substances for the modification of its surface: lithium chloride, potassium chloride, barium formate, and magnesium acetate.

Sample 6 is prepared in the following manner: 50 g. of a finely dispersed non-porous silica having a specific surface area of 380 m$^2$/g. are mixed with 350 ml. of water. Into the resulting suspension 1 g. of crystalline lithium chloride is then introduced with thorough stirring. A silica xerogel formed after drying of the suspension at 20°C. is calcined in the air at a temperature of 900°C for a period of 6 hours. The calcined xerogel is ground and screened to separate the 0.25-0.5 mm. fraction.

Sample 7 is prepared by mixing 50 g. of a finely dispersed non-porous silica having a specific surface area of 380 m$^2$/g. with 200 g. of an aqueous solution of lithium chloride containing 20 g. of the salt. The xerogel resulting from drying of the suspension at a temperature of 20°C is then calcined in air at a temperature of 650°C for a period of 6 hours. The calcined xerogel is ground and screened to separate the fraction having a particle size of from 0.25 to 0.5 mm.

Samples 8 to 11 are prepared in a similar manner as Sample 7 by mixing a finely dispersed non-porous silica with aqueous salt solutions (types and amount of modifying additives are shown hereinbelow). The suspensions obtained after the preparation of Samples 8 to 11 are subjected to drying until the formation of a silica xerogel. The latter is ground and screened to separate the fraction containing particles of 0.25 to 0.5 mm. in size (Samples 8 and 9) or the xerogel is calcined prior to the grinding abd screening (Samples 10 and 11).

The conditions of preparation and structural characteristics of adsorbent Samples 6 to 11 modified with salts of alkali- or alkaline-earth metals are summarized in Table III.

Table III

| Adsorbent Sample No. | Specific surface area of non-porous silica, m$^2$/g. | Salt content in the suspension, % by weight of the silica | Drying temperature of the suspension, °C | Calcination temperature of the suspension, °C | Structural characteristics of the adsorbent | | |
|---|---|---|---|---|---|---|---|
| | | | | | S, m$^2$/g | V, cm$^3$/g | d, Å |
| 6 | 380 | 2% LiCl | 20 | 900 | 16 | 1.12 | 2800 |
| 7 | 380 | 40% LiCl | 20 | 650 | 4 | 1.22 | 12200 |
| 8 | 170 | 40% LiCl | 200 | — | 84 | 1.44 | 690 |
| 9 | 380 | 40% KCl | 200 | — | 180 | 1.25 | 280 |
| 10 | 170 | 20% Ba(HCOO)$_2$ | 140 | 700 | 80 | 1.24 | 620 |
| 11 | 170 | 25% Mg(CH$_3$COO)$_2$ | 150 | 600 | 110 | 1.78 | 650 |

It follows from Table III that the calcination of a finely dispersed silica containing modifying additives in the form of salts of alkali- and alkaline-earth metals enables considerably reducing a specific surface area of an adsorbent. The maximum effect of reducing a specific surface area upon the calcination is obtained when using an alkali metal chloride as a modifying additive.

Modifying the silica surface with various salts of alkali- and alkaline-earth metals results in changing chromatographic properties of the adsorbent samples to be prepared. Data illustrating chromatographic properties of adsorbent Samples 6 to 11 are given hereinbelow in the Summary Table.

EXAMPLE 4

Samples 12 to 14 of the adsorbent are prepared from a finely dispersed non-porous silica using heat-resistant polymers as modifying agents for its surface, viz. polyphenyldisiloxane and a polyarylate comprising a polycondensation product of phenolphthalein and phthalic acid.

Polyphenyldisiloxane (molecular weight 500,000) is produced by a polycondensation reaction of phenyltrichlorosilane hydrolysis products (cf; J. F. Brown et al., J.Amer.Chem.Soc., 82, 6194, 1960; S. A. Pavlova, V. I. Pakhomov, I. I. Tverdokhlebova, "Vysokomolekuliarnyje Soedinenija," 6, 1275, 1964). Said polymer has a stereospecific double chain structure:

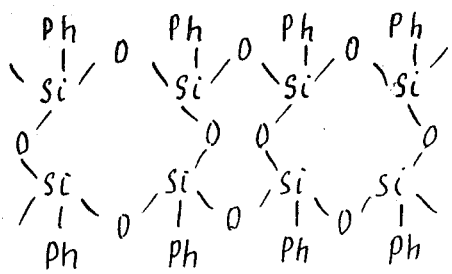

Polyarylate (molecular weight 30,000) is produced by polycondensation of phenolphthalein and isophthalic acid (cf. A. A. Askadskij "Physical Chemistry of Polyarylates," Moscow, "Khimija" Publishers, 1968, p. 32). The polymer thus synthesized corresponds to the following formula:

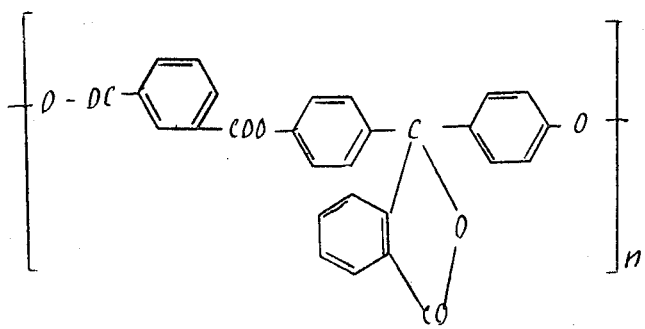

Sample 12 is prepared in accordance with the following procedure: 10 g. of a finely dispersed non-porous silica having a specific surface area of 150 m²/g. are mixed with 40 g. of a solution of polyphenyldisiloxane in benzene containing 0.2 g. of the polymer. The resulting suspension is subjected to drying in the air at a temperature of 20°C while evaporating the major portion of the solvent, and then is dried at a temperature of 200°C in an atmosphere of nitrogen. The xerogel thus obtained is ground and screened to separate the 0.25 to 0.5 mm. fraction.

Sample 13 is prepared in a similar manner using, as a dispersion medium, 40 g. of a solution of polyphenyldisiloxane in benzene containing 1.0 g. of the polymer. Prior to the grinding, the xerogel is calcined at a temperature of 275°C in an atmosphere of nitrogen.

Sample 14 is prepared by mixing 10 g. of a finely dispersed non-porous silica having a specific surface area 150 m²/g. with 40 g. of a polyarylate solution (a polycondensation product of phenolphthalein and isophthalic acid) in dioxane. The solution contains 0.6 g. of the polymer. The resulting suspension is subjected to drying in the air at a temperature of 20°C while evaporating a major portion of the solvent, after which the suspension is dried at 200°C in an atmosphere of nitrogen. The silica xerogel thus obtained is ground and screened to separate the 0.25 to 0.5 mm. fraction.

Data illustrating chromatographic properties of the adsorbent Samples are given hereinbelow in the Summary Table.

EXAMPLE 5

Samples 15 to 21 are prepared from a finely dispersed non-porous silica using acetylene black, produced by thermal cracking of acetylene, as a modifying agent for the silica surface.

Sample 15 is prepared by mixing a finely dispersed non-porous silica having a specific surface area of 170 m²/g. in the amount of 50 g. with 180 ml. of water. 13.5 g. of acetylene black are introduced into the resulting suspension with thorough stirring thereof. The suspension is air-dried first at 20°C and then at a temperature of 150°C. The silica xerogel thus obtained is calcined in an atmosphere of helium at a temperature of 900°C for a period of 4 hours. The calcined xerogel is ground and screened to separate the fraction containing particles of 0.25 to 0.5 mm. in size.

Sample 16 is prepared by mixing a finely dispersed non-porous silica having a specific surface area of 170 m²/g. in an amount of 50 g. with 0.5 g. of acetylene black, after which 180 ml. of water are introduced into the resulting mixture under thorough stirring. The mixing is continued until the formation of a uniform suspension. The suspension is air-dried first at 20°C and then at a temperature of 150°C. The silica xerogel thus obtained is ground and screened to separate the fraction containing particles of 0.25 to 0.5 mm. in size.

In a manner similar to the preparation of Sample 16, Samples 17 to 21 are prepared with the values of acetylene black content of 5, 10, 20, 42, and 60 percent based on the weight of silica, respectively.

Structural characteristics of Samples 15 to 21 are given in Table IV below.

Table IV

| Adsorbent Sample Sample No. | Acetylene black content, % by weight of the silica | Structural characteristics of the adsorbent Samples | | |
|---|---|---|---|---|
| | | S, m²/g. | V, cm³/g. | d, A |
| 15 | 27 | 125 | 1.65 | 455 |
| 16 | 1 | 156 | 1.17 | 300 |
| 17 | 5 | 145 | 1.10 | 300 |
| 18 | 10 | 145 | 1.06 | 290 |
| 19 | 20 | 135 | 1.25 | 370 |
| 20 | 42 | 121 | 1.33 | 440 |
| 21 | 60 | 112 | 1.5 | 535 |

Data illustrating chromatographic properties of Samples 15 to 20 are given hereinbelow in the Summary Table.

As has been indicated hereinabove, chromatographic properties of an adsorbent may be evaluated by the $\alpha$ factor. In Summary Table V $\alpha$ values are given comprising ratios of corrected retention volumes $v_g'$ for various organic compounds to the corrected retention volume $v_g''$ for n-heptane; the $\alpha$ values are obtained at a temperature of from 150 to 175°C.

It may be seen from Table V that Samples 2 to 5 prepared as in Example 2 have a stronger polarity and higher retention of aromatic hydrocarbons and oxygen-containing organic compounds (diethyl ether; acetone) than the adsorbent non-modified with alkalis and produced by the known process. Thus, benzene appears at the outlet of a column (containing the adsorbent non-modified with alkalis and produced by the known process) approximately simultaneously with n-heptane, while toluene appears simultaneously with n-nonane. At the outlet of the column containing Samples 2 to 5 benzene appears much later than n-heptane, and toluene later than n-nonane.

It follows from the above Table that, for Samples 6 to 11, produced in accordance with Example 3, the values of corrected retention volumes $v_g'$ of aromatic compounds, diethyl ether, and acetone divided by the value of corrected retention volume $v''$ of n-heptane are higher than for the adsorbent produced by the known process. This specifity is less pronounced for Samples 8 and 9 containing, as modifying components, 40 percent by weight of lithium chloride and 40 percent by weight of potassium chloride respectively. An especially great specificity with respect to aromatic hydrocarbons is shown by Sample 10 modified by a barium salt. Thus, with a column filled with this Sample the time of benzene appearance is much longer than that of n-nonane.

According to Table V, modifying the surface of a finely dispersed non-porous silica with polyphenyldisiloxane imparts specificity to said surface in respect of aromatic compounds, diethyl ether, and acetone. This specificity, however, is less pronounced than for Table V

| Sample No. | Adsorbent Sample | Relative retention volumes ($\alpha$) of organic compound with respect to n-heptane | | | | | | | | |
|---|---|---|---|---|---|---|---|---|---|---|
| | | n-hexane | n-heptane | n-octane | n-nonane | benzene | toluene | xylene | diethyl ether | Acetone |
| — | Sample prepared by the known process | 0.57 | 1 | 1.8 | 3.3 | 1.3 | 3.0 | 6.5 | 6.3 | 8.8 |
| 2 | No. 2 | 0.60 | 1 | 1.8 | 3.1 | 3.5 | 9.0 | 23 | — | — |
| | No. 3 | 0.53 | 1 | 1.7 | 3.1 | 4.3 | 8.9 | 18 | 14 | — |
| | No. 4 | 0.58 | 1 | 1.8 | 3.2 | 2.0 | 5.6 | 12 | 22 | — |
| | No. 5 | 0.57 | 1 | 1.7 | 2.7 | 2.6 | 4.8 | 13 | 26 | — |
| 3 | No. 6 | 0.55 | 1 | 2.0 | 3.7 | 1.7 | 3.7 | 8.7 | 19 | — |
| | No. 7 | 0.50 | 1 | 1.5 | 3.0 | 3.0 | 7.0 | 16 | 220 | — |
| | No. 8 | 0.63 | 1 | 1.6 | 2.5 | 1.8 | 3.4 | 6.2 | 14 | — |
| | No. 9 | 0.54 | 1 | 1.8 | 3.2 | 1.6 | 3.5 | 7.2 | 7.5 | 14 |
| | No. 10 | 0.54 | 1 | 1.8 | 3.5 | 7.8 | 19 | — | — | — |
| | No. 11 | 0.50 | 1 | 2.2 | 4.8 | 1.6 | 4.0 | 8.4 | — | — |
| 4 | No. 12 | 0.48 | 1 | 2.1 | — | 2.1 | 5.4 | 14 | 13 | 16 |
| | No. 13 | 0.60 | 1 | 1.6 | 2.7 | 1.7 | 3.5 | 6.8 | 8.4 | 14 |
| | No. 14 | 0.52 | 1 | 1.8 | 3.4 | 1.4 | 3.0 | 6.3 | 4.6 | 6.9 |
| 5 | No. 15 | 0.42 | 1 | 2.4 | 5.9 | 0.6 | 1.6 | 4.4 | 2.0 | 2.8 |
| | No. 16 | 0.56 | 1 | 1.9 | 3.7 | 1.3 | 2.8 | 6.3 | 5.7 | 7.9 |
| | No. 17 | 0.51 | 1 | 2.0 | 4.0 | 1.1 | 2.6 | 5.7 | 5.1 | 7.5 |
| | No. 18 | 0.46 | 1 | 2.2 | 4.8 | 0.91 | 2.2 | 4.9 | 3.5 | 5.3 |
| | No. 19 | 0.43 | 1 | 2.4 | 6.0 | 0.68 | 1.8 | 4.9 | 2.5 | 3.6 |
| | No. 20 | 0.40 | 1 | 2.6 | 6.9 | 0.43 | 1.3 | 4.0 | 1.0 | 1.5 | the samples modified with certain alkalis and salts. It may be also seen from the Table, that a chromatographic column filled with Sample 14 containing, as a modifying component, a polycondensation product of phenolphthalein and isophthalic acid has a weaker retention of polar compounds (diethyl ether and acetone) than Samples 1 to 13 and the sample prepared by the known process. There is a slight specificity, in respect of aromatic hydrocarbons, on Sample 14: benzene exit time exceeds that of n-heptane but is less than the exit time of n-octane.

Table V shows that Samples 15 to 20 containing 27, 1, 5, 10, 20, and 42 percent of carbon black respectively are substantially distinguished, in their chromatographic properties, from the adsorbent prepared by the known process. Relative retention volumes ($\alpha$) of aromatic compounds, as well as of diethyl ether and acetone are smaller on Samples 15 to 20 than on the adsorbent containing no carbon black, which indicates to a lower polarity of the adsorbents prepared. Moreover, with an increasing carbon black content of an adsorbent, the order of appearance of the compounds from a chromatographic column may be changed. This condition is well illustrated by the scales shown in FIG. 3 with plotted thereon values of relative (with respect to n-heptane) retention volumes of some organic compounds: n-hexane (a), n-heptane (b), n-octane (c), n-nonane (d), benzene (e), toluene (f), diethyl ether (g), and acetone (h). Each scale relates to a specific type of an adsorbent: scale I to the adsorbent prepared from a finely dispersed non-porous silica by the known process; scales II, III, IV, V, VI, VII — to Samples 16, 17, 18, 19, 15, and 20 produced from a finely dispersed non-porous silica using, as a modifying component, acetylene black in the amount of 1, 5, 10, 20, 27, 42 percent by weight respectively; scale VIII relates to the adsorbent from acetylene black.

In accordance with the scales shown in FIG. 3, an increase in the carbon black content of an adsorbent results in a sharp decrease of relative retention volumes ($\alpha$) of low-boiling polar compounds, and in an increase of $\alpha$ values for high-boiling compounds such as n-octane, n-nonane, toluene. This causes a change in the order of appearance of the substances from a chromatographic column. Thus, the substances on Sample 16 containing acetylene black in the amount of 1 percent based on the weight of the silica, appear from the column in the following order: (Scale II): n-heptane (b), benzene (e), n-octane (c), toluene (f), n-nonane (d), diethyl ether (g), acetone (h). The same substances appear in the following order on Sample 19 containing 20 percent of carbon black based on the silica weight (Scale V): benzene (e), n-heptane (b), toluene (f), n-octane (c), diethyl ether (g), acetone (h), n-nonane (d).

Therefore, by changing, during the synthesis, the amount of carbon black being introduced into the suspension, it is possible to vary, over a broad range, chromatographic properties of the adsorbent to be produced.

The data of Table V show that the process according to the present invention makes it possible to prepare an adsorbent which is substantially distinguished from the adsorbent prepared from the finely dispersed non-porous silica of the known process. A more polar adsorbent (Samples 2 to 13) may be prepared by the process of the present invention, i.e., an adsorbent more strongly adsorbing both polar compounds (diethyl ether, acetone) and specifically adsorbed aromatic hydrocarbons (benzene, toluene, xylene). In addition, the process according to the present invention enables the preparation of a less polar adsorbent (Samples 14 to 20) than the adsorbent produced by the known process.

Consequently, the process thus described makes it possible to vary, within broad limits, adsorptive and chromatographic properties of the adsorbent being produced and to regulate, over a wide range, its selectivity.

What is claimed is:

1. A process for preparing a wide-pore silicon-containing adsorbent for chromatography, comprising preparing a suspension of a finely dispersed non-porous silica having a specific surface 30 to 380 m$^2$/g in a suitable liquid dispersion medium containing a modifying component selected from the group consisting of alkalis, alkali metal salts, alkaline-earth metal salts, carbon black, polyphenyldisiloxane, and a condensation product of phenolphthalein and phthalic acid; and drying said suspension at a temperature of about 15° to 200°C to form a silica xerogel.

2. A process according to claim 1, wherein the liquid dispersion medium is water.

3. A process according to claim 1, wherein the dried silica xerogel is calcined in an atmosphere of a gas selected from the group consisting of air and an inert gas at a temperature of from 250°C. to 900°C.

4. A process according to claim 3, wherein the calcined product is subjected to grinding.

5. A process according to claim 1, wherein the modifying component is present in the amount of 1–40 per cent by weight of the weight of said silica.

6. A process according to claim 5, wherein the resultant silica xerogel is calcined in an atmosphere of a gas selected from the group consisting of air and an inert gas at a temperature of from 250°C. to 900°C. and ground.

7. A process according to cliam 1, wherein the modifying component is carbon black in an amount of 1–60 per cent by weight of the weight of said silica and the resultant silica xerogel is calcined in an atmosphere of a gas selected from the group consisting of air and an inert gas at a temperature of from 250°C. to 900°C. and ground.

8. A process according to claim 1, wherein said liquid dispersion medium is a suitable organic solvent and said modifying component is selected from the group consisting of polyphenyldisiloxane and a polycondensation product of phenolphthalein and phthalic acid, said modifying component being present in the resulting suspension in an amount of from 2 to 10 per cent based on the weight of silica, said suspension being subjected to drying at a temperature of from 15°C. to 200°C.

9. A process according to claim 8, wherein the resultant silica xerogel is calcined in an atmosphere of a gas selected from the group consisting of air and an inert gas at a temperature of from 250°C. to 300°C.

* * * * *